United States Patent [19]
Miyazaki et al.

[11] Patent Number: 6,130,712
[45] Date of Patent: Oct. 10, 2000

[54] ELIMINATING THE INFLUENCE OF RANDOM NOISE PRODUCED BY AN OPTICAL BLACK PIXEL ON A REFERENCE OUTPUT

[75] Inventors: Keizo Miyazaki, Machida; Shigetoshi Sugawa, Atsugi, both of Japan

[73] Assignee: Canon Kabushiki Kaisha, Tokyo, Japan

[21] Appl. No.: 08/868,996

[22] Filed: Jun. 4, 1997

[30] Foreign Application Priority Data

Jun. 11, 1996 [JP] Japan .................................. 8-149141

[51] Int. Cl.[7] ........................................................ H04N 9/64
[52] U.S. Cl. .............................................. 348/243; 348/245
[58] Field of Search .................................... 348/207, 241, 348/243, 244, 245, 246, 247, 248, 251; 250/208.1; H04N 5/335, 9/64

[56] References Cited

U.S. PATENT DOCUMENTS

| | | |
|---|---|---|
| Re. 34,309 | 7/1993 | Tanaka et al. . |
| 4,835,404 | 5/1989 | Sugawa et al. . |
| 4,879,470 | 11/1989 | Sugawa et al. . |
| 4,967,067 | 10/1990 | Hashimoto et al. . |
| 4,972,243 | 11/1990 | Sugawa et al. . |
| 5,355,164 | 10/1994 | Shimoyama et al. ........... 348/243 |
| 5,376,966 | 12/1994 | Takase ........................... 348/243 |
| 5,724,094 | 3/1998 | Tseng et al. .................... 348/243 |

FOREIGN PATENT DOCUMENTS

| | | |
|---|---|---|
| 0137704 | 4/1985 | European Pat. Off. . |
| 0232593 | 8/1987 | European Pat. Off. . |

OTHER PUBLICATIONS

Patent Abstracts Of Japan, vol. 018, No. 280 (E–1555), May 27, 1994 & JP 06 053477 A (Sony Corp) Feb. 25, 1994 *abstract*.

Patent Abstracts Of Japan, vol. 14, No. 444 (E–0982), Sep. 21, 1990 & JP 02 174381 A (Dainippon Screen Mfg Co Ltd), Jul. 5, 1990 *abstract*.

Patent Abstracts Of Japan, vol. 017, No. 202 (E–1353), Apr. 20, 1993 & JP 04 345277 A (Matsushita Electric Ind Co Ltd), Dec. 1, 1992 *abstract*.

*Primary Examiner*—Tuan Ho
*Attorney, Agent, or Firm*—Fitzpatrick, Cella, Harper & Scinto

[57] ABSTRACT

In order to obtain a reference output from which density nonuniformity and fixed pattern noise are removed using OB pixels in a solid-state image pickup device, a solid-state image pickup device which has a plurality of storage units for storing pixel signals output from a plurality of photoelectric conversion elements, which are formed on a single semiconductor substrate and at least two of which are shielded from light, in correspondence with the photoelectric conversion elements. Pixel signal outputs from the shielded photoelectric conversion elements are subjected to averaging processing on the storage units. Also, in the solid-state image pickup device, the storage units are formed of capacitances, which are electrically and temporarily connected to each other to attain the averaging processing.

15 Claims, 5 Drawing Sheets

ELIMINATING THE INFLUENCE OF RANDOM NOISE PRODUCED BY AN OPTICAL BLACK PIXEL ON A REFERENCE OUTPUT

BACKGROUND OF THE INVENTION

1. Field of the Invention

The present invention relates to a solid-state image pickup device used in an image reading unit of a copying machine, facsimile apparatus, or the like.

2. Related Background Art

As conventional solid-state image pickup devices, various elements such as CCD type, photodiode type, bipolar transistor type, MOS type, and the like have been developed and used as solid-state image pickup elements and photoelectric conversion elements. Also, these elements are used as a line sensor obtained by arranging a large number of these elements in one line on a semiconductor chip and as an area sensor obtained by arranging these elements two-dimensionally. The line sensor is used in an image sensor, copying machine, facsimile apparatus, and the like. More specifically, the line sensor reads an original image by moving an original or a sensor system and transfers an image signal to a photosensitive body to copy it, or reads an original image in units of lines and writes the original image signal on a recording paper sheet. As for the area sensor, various applications such as a video camera, magnifying camera, video microscope, and the like are expected promising for the multimedia era in future.

For example, such solid-state image pickup device is constituted by the solid-state image pickup element for photoelectrically converting an image to generate pixel charges, a storage means such as a capacitor for temporarily storing pixel charges for one line in units of pixels, and a transfer means for time-serially outputting the pixel charges in turn in accordance with timing signals from a horizontal scanning circuit.

In general, in such solid-state image pickup device such as a line sensor, area sensor, or the like that uses a plurality of photoelectric conversion elements as pixels, some of a large number of pixels are shielded from light as optical black pixels (to be referred to as "OB pixels" hereinafter), an OB pixel signal is used as a reference output, and the difference between the reference output and the other non-shielded pixel signal is calculated and used as a regular sensor signal. As the method of using the signal from the OB pixel as a reference output, for example, a clamp circuit shown in FIG. 2A is known. In FIG. 2A, the clamp circuit includes a clamp capacitor 21 and a switch transistor 22.

When a sensor output shown in FIG. 2B is input to this clamp circuit, and the pulse φCLP is applied during the OB output period, as shown in FIG. 2B, the sensor output of the OB pixel becomes a reference signal, and components indicated by hatching in FIG. 2B as the differences between regular sensor outputs S1, S2, S3, and the like, and the reference signal are output as effective signal output components.

When a plurality of OB pixels are arranged, the signals from these OB pixels are directly output in turn in units of pixels.

For this reason, when the clamp circuit is used, the reference output of the OB pixel is determined based on the output when the clamp pulse φCLP changes from High to Low. Hence, even when the application time of the clamp pulse φCLP is changed in correspondence with three OB pixels shown in FIG. 2C, the output from only one pixel (in this case, an OB pixel OB3) is used as the reference output.

The output from the shielded OB pixel includes random noise. Therefore, when the output from a single OB pixel is used as a reference output in this manner, the random noise produced by a specific OB pixel is reflected in the reference output. The random noise in the reference output corresponds to, e.g., random changes in reference output every time data for one line is read from the line sensor, and the output image suffers density nonuniformity at every line in the scanning direction of the sensor.

SUMMARY OF THE INVENTION

It is, therefore, an object of the present invention to obtain an output image which suffers less density nonuniformity by eliminating the influence of random noise produced by an OB pixel on the reference output when a solid-state image pickup device such as a line sensor, area sensor, or the like having a plurality of pixels uses the output from the OB pixel as the reference output. It is another object of the present invention to obtain an image signal of effective pixels free from any fixed pattern noise and density nonuniformity by obtaining the reference output after the difference signal between the noise component and signal component of each OB pixel is obtained.

In order to achieve the above objects, according to the present invention, a solid-state image pickup device having a plurality of storage means for storing signals output from a plurality of photoelectric conversion elements, at least two of which are shielded from light, is characterized in that the outputs from the at least two shielded photoelectric conversion elements are subjected to averaging processing on the storage means.

If V [Vr.m.s: effective voltage] represents random noise produced by each OB pixel, since the random noise components are squared and averaged by executing averaging, the averaged random noise, i.e., the random noise of the reference output becomes $V/\sqrt{N}$ [Vr.m.s] (N is the number of OB pixels averaged), and is reduced to $1/\sqrt{N}$. As a consequence, density nonuniformity of the output image can be eliminated.

The solid-state image pickup device is characterized in that each storage means has capacitances for a noise component and a signal component from the corresponding photoelectric conversion element, and the reference output is obtained by executing averaging processing of pixel signals from the capacitances and differentially outputting output signals for the individual components. Also, the solid-state image pickup device is characterized in that the averaging processing is attained by storing pixel signals in the storage means corresponding to the shielded photoelectric conversion elements and commonly outputting the pixel signals in the storage means using a semiconductor switch means.

Other objects and features of the present invention will become apparent from the following specification and the accompanying drawings.

DETAILED DESCRIPTION OF THE PREFERRED EMBODIMENTS

Figure 1:
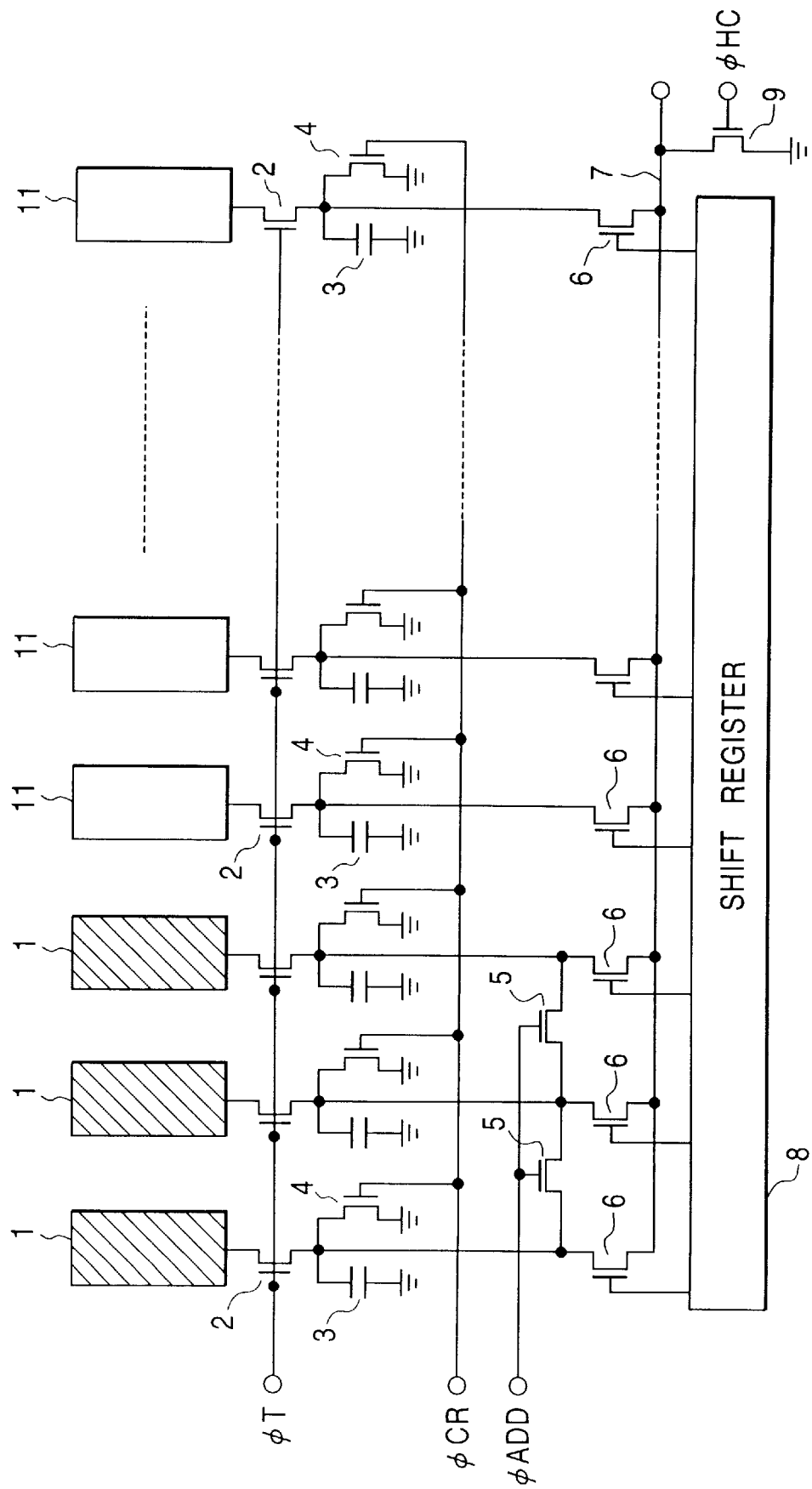
FIG. 1 is a circuit diagram for explaining the averaging method of OB pixel outputs according to the first embodiment of the present invention.
Figure 2A:
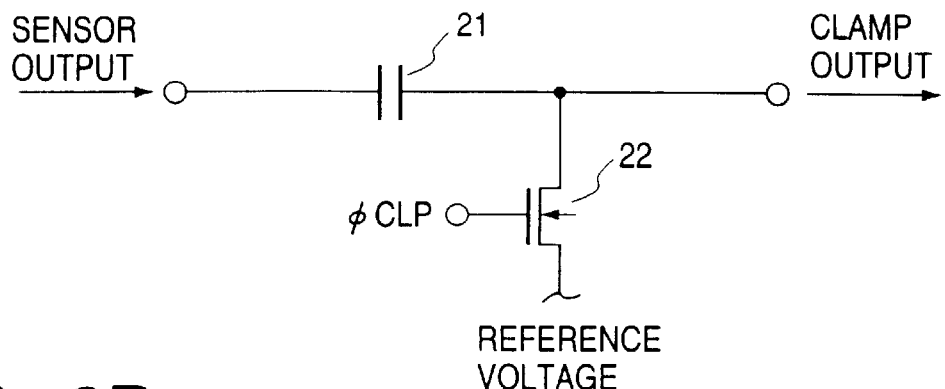
FIGS. 2A, 2B, and 2C are respectively a circuit diagram and charts for explaining the method of using the OB pixel output as a reference output.
Figure 2B:
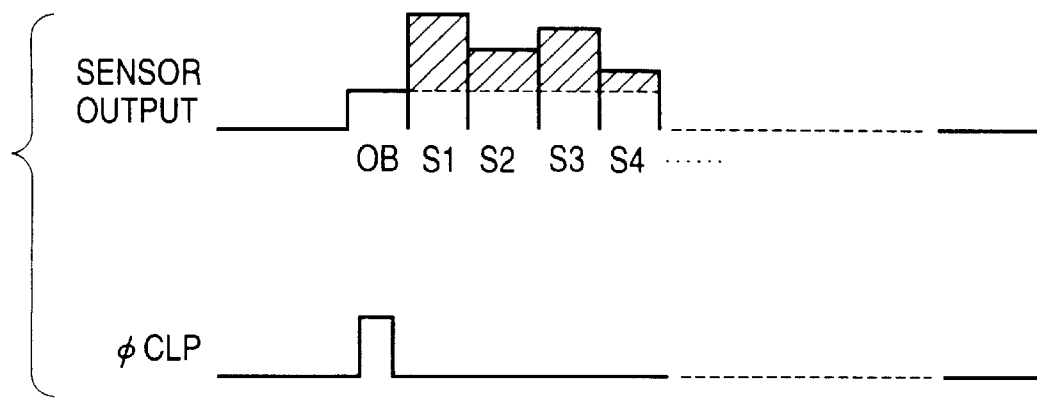
Figure 2C:
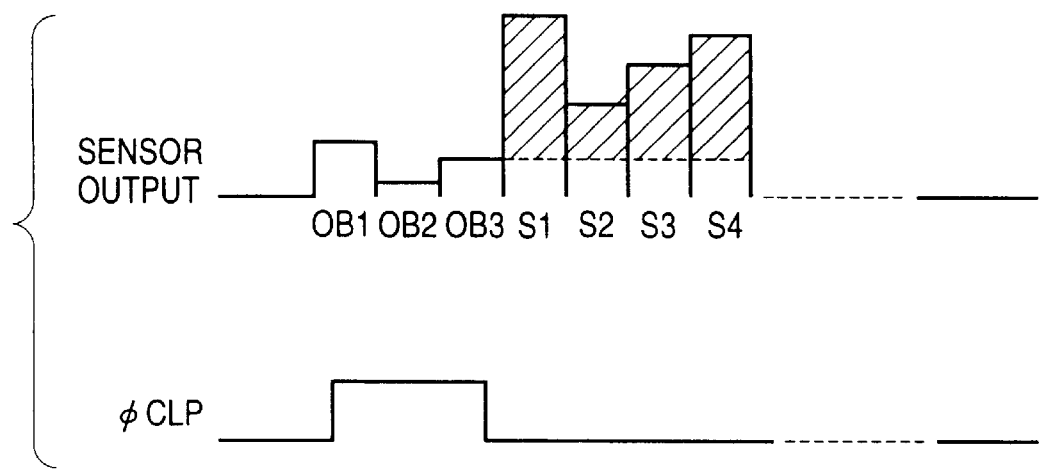

The first embodiment of the present invention will be described below with reference to the accompanying drawings. FIG. 1 shows the first embodiment of the present invention. Referring to FIG. 1, the first embodiment comprises a plurality of shielded photoelectric conversion elements (OB pixels) 1, switch transistors 2 for reading out signals from the photoelectric conversion elements to storage capacitors, storage capacitors (CT) 3 for memorizing signals from the photoelectric conversion elements, reset switch transistors 4 for resetting the storage capacitors CT 3, an averaging switch transistor 5 for averaging a signal on the storage capacitor CT 3, read switch transistors 6 for reading out signals on the storage capacitors CT 3 onto a common read line 7, which is connected to a terminal OUT, a shift register 8 serving as a horizontal scanning circuit for enabling/disabling the switch transistors 6 in turn, a reset transistor 9 for resetting the common read line 7, and a large number of non-shielded photoelectric conversion elements 11 (effective pixels) arranged on a line.

In this arrangement, after the photoelectric conversion elements 1 and 11 are reset and initialized by a reset circuit (not shown), the pixel signals stored in these photoelectric conversion elements after an elapse of a predetermined period of time are simultaneously read out to and stored in the storage capacitors CT 3 connected to the individual photoelectric conversion elements by applying a high-level transfer control pulse $\phi T$ to enable the switch transistors 2. After the switch transistors 2 are disabled, a high-level averaging control pulse $\phi ADD$ is applied to enable the averaging switch transistors 5, thereby averaging the pixel signals read out from the OB pixels 1 to the storage capacitors CT 3. As a consequence, random noise components produced until the pixel signals are read out to the storage capacitors CT 3, i.e., the pixel signals in the storage capacitors CT 3 corresponding to the OB pixels 1, are averaged by storing charges of identical level.

Thereafter, the switch transistors 5 are disabled, and the shift register 8 scans the read switch transistors 6 corresponding to the OB pixels 1 and the non-shielded effective pixels 11 by applying a high-level pulse. Hence, pixel signals on the storage capacitors CT 3 are sequentially output to the terminal OUT via the common read line 7. Note that the common read line 7 is reset via the switch transistor 9 by applying a reset pulse $\phi HC$ every time the pixel signals on all the storage capacitors CT 3 are read out. After all the pixel signals on one line are read out, a high-level control pulse $\phi CR$ is applied to enable the switch transistors 4 to reset the storage capacitors CT 3, thus ending a series of operations. The series of operations are executed as one cycle, and are repeated sequentially.

According to this embodiment, since the random noise components produced by the plurality of OB pixels 1 are averaged, i.e., the averaged OB pixel output from which random noise is reduced, is obtained, an output image which suffers less density nonuniformity can be obtained using the OB pixel output as a reference output. In this embodiment, three OB pixels are used. However, the number of OB pixels is not limited to three, but two or a plurality of (n) OB pixels may be used. In this case, (n−1) averaging switch transistors 5 are connected to the output lines, and are applied with the averaging control pulse $\phi ADD$, thus obtaining an image signal in which random noise components are averaged. When this image signal is used as a reference output to extract the difference between pixel signals from the non-shielded effective pixels 11 and the reference output, an image signal corresponding to the object image can be obtained from an image signal including a so-called dark signal.

Figure 3:
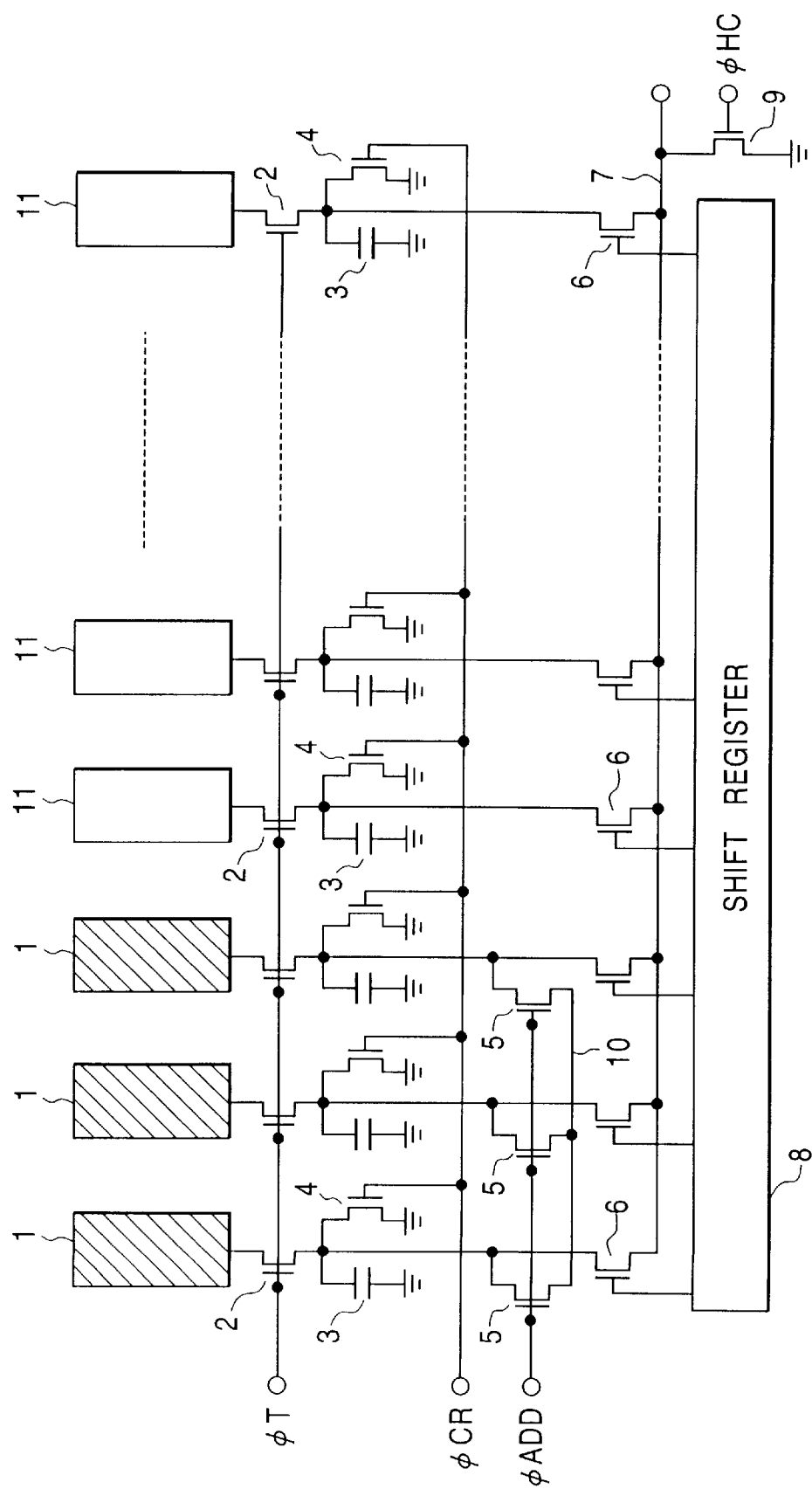
FIG. 3 is a circuit diagram for explaining the averaging method of OB pixel outputs according to the second embodiment of the present invention.

FIG. 3 shows the second embodiment of the present invention. Referring to FIG. 3, a common line 10 connects CT addition switch transistors 5 to each other. The same reference numerals in FIG. 3 denote the same constituting members as in FIG. 1, and a detailed description thereof will be omitted.

The operation of this embodiment is substantially the same as that in the first embodiment, except that the pixel signals from OB pixels 1 are added on corresponding storage capacitors CT 3 via common line 10. More specifically, after switch transistors 2 are disabled, when a high-level averaging control pulse $\phi ADD$ is applied to simultaneously enable the CT addition switch transistors 5, the storage capacitors CT 3 are connected to each other through the common line, and thereby averaging the pixel signals read out from the OB pixels 1 to the corresponding storage capacitors CT 3. Thereafter, the switch transistors 5 are disabled, and read switch transistors 6 are time-serially enabled in response to timing signals from a shift register 8, thereby outputting the charges in the storage capacitors CT 3 to the terminal OUT via a common read line 7.

As described above, in this embodiment as well, the averaged OB pixel output from which random noise components of the OB pixels are averaged can be obtained, and an output image which suffers less density nonuniformity can be obtained using the OB pixel output as a reference output, thus obtaining the same effect as in the first embodiment.

Figure 4:
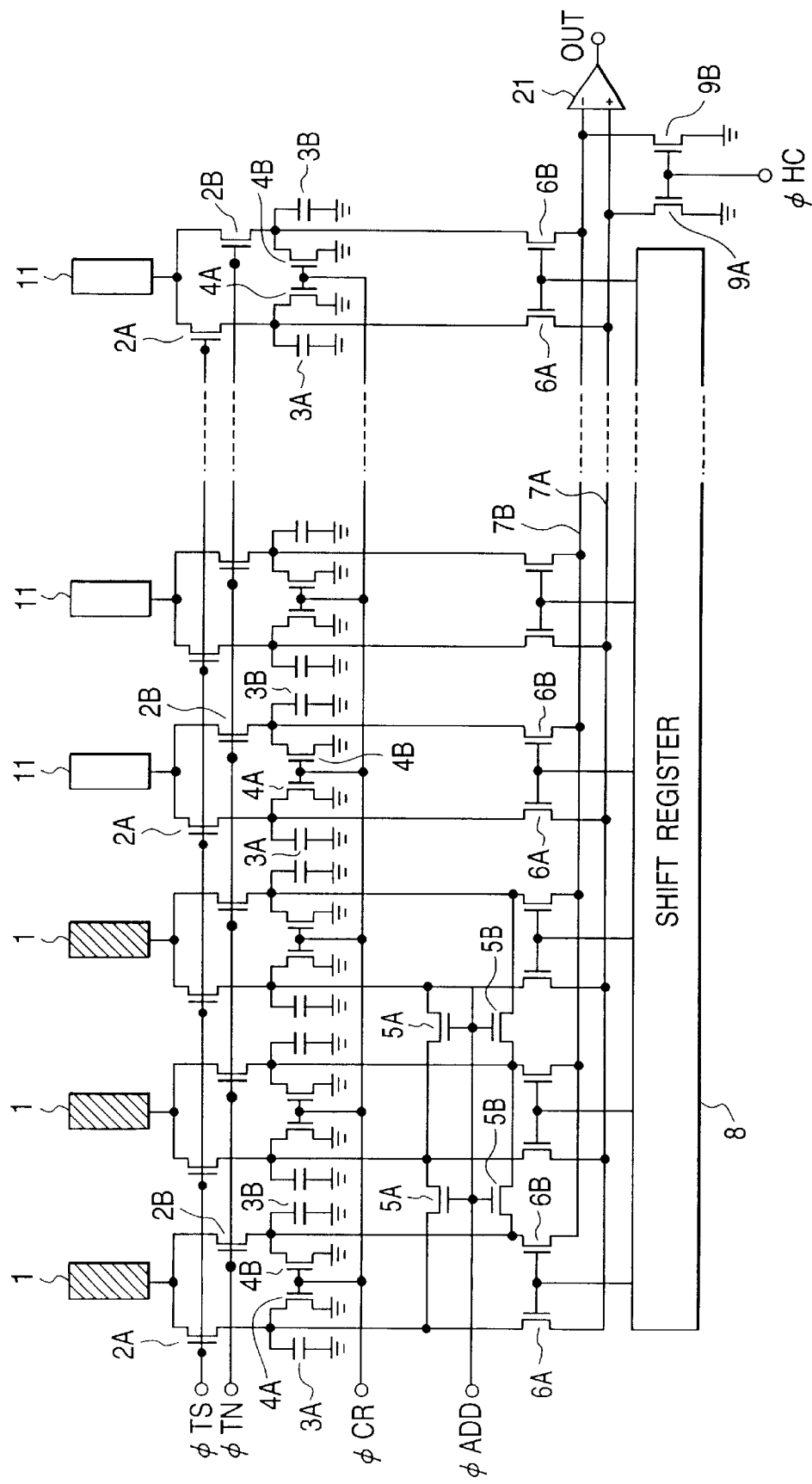
FIG. 4 is a circuit diagram for explaining the averaging method of OB pixel outputs according to the third embodiment of the present invention.

FIG. 4 shows the third embodiment of the present invention. FIG. 4 shows the arrangement wherein two systems of the circuit after the photoelectric conversion elements in FIG. 1 are arranged in units of photoelectric conversion elements, and the difference between the outputs from the two systems is calculated. In FIG. 4, symbols A and B appended to reference numerals respectively represent the two systems, and the same reference numerals in FIG. 4 denote the same constituting members as in FIG. 1. Note that a differential circuit 21 is connected to common read lines 7A and 7B and obtains a difference signal between the outputs on the two lines. Such arrangement is effectively used when fixed pattern noise (FPN) is to be removed, and operates as follows.

Referring to FIG. 4, immediately after photoelectric conversion elements 1 and 11 are initialized, a high-level noise transfer pulse $\phi TN$ is applied to enable switch transistors 2B, thereby simultaneously reading out signals immediately after initialization to storage capacitors CTN 3B. In this case, the readout image signal corresponds to fixed pattern noise itself, and is stored as N component pixel signals in storage capacitors 3B. After the switch transistors 2B are disabled, the photoelectric conversion elements 1 and 11 are initialized again, and signals stored in these photoelectric conversion elements 1 and 11 after an elapse of a predetermined period of time are simultaneously read out to storage capacitors CTS 3A by applying a high-level signal transfer pulse φTS to enable switch transistors 2A. The readout image signal in this case corresponds to the sum of the signal components stored in the individual photoelectric conversion elements and FPN, and will be referred to as an S+N component image signal hereinafter. In the case of photoelectric conversion elements that allow nondestructive reading, the photoelectric conversion elements need not be initialized after N components are read out. Subsequently, after the switch transistors 2A are disabled, a high-level averaging control pulse φADD is applied to enable switch transistors 5A and 5B, thereby respectively averaging pixel signals read out from the OB pixels to the storage capacitors CTS 3A and CTN 3B.

Thereafter, the switch transistors 5A and 5B are disabled, and a shift register 8 enables and scans switch transistors 6A and 6B so as to sequentially output the pixel signals on the storage capacitors CTS 3A and CTN 3B via the common read lines 7A and 7B. These pixel signals, i.e., the S+N component image signal and N component image signal are output via the differential circuit 21 to yield (S+N)−N=S. As a result, S components alone are obtained, and FPN is removed.

Note that the common read lines 7A and 7B are reset via switch transistors 9A and 9B by applying a reset pulse φHC every time the pixel signals on the storage capacitors CTS and CTN are read out. After all the pixel signals are read out, a high-level reset control pulse φCR is applied to enable switch transistors 4A and 4B so as to reset the charges on the storage capacitors CTS 3A and CTN 3B, thus ending a series of operations. The series of operations are executed as one cycle, and are repeated sequentially.

According to this embodiment, an OB pixel output in which random noise components are averaged, i.e., random noise is reduced, can be obtained, and an output image which suffers less density nonuniformity can be obtained using this OB pixel output as a reference output. Also, fixed pattern noise (FPN) can also be removed.

Figure 5:
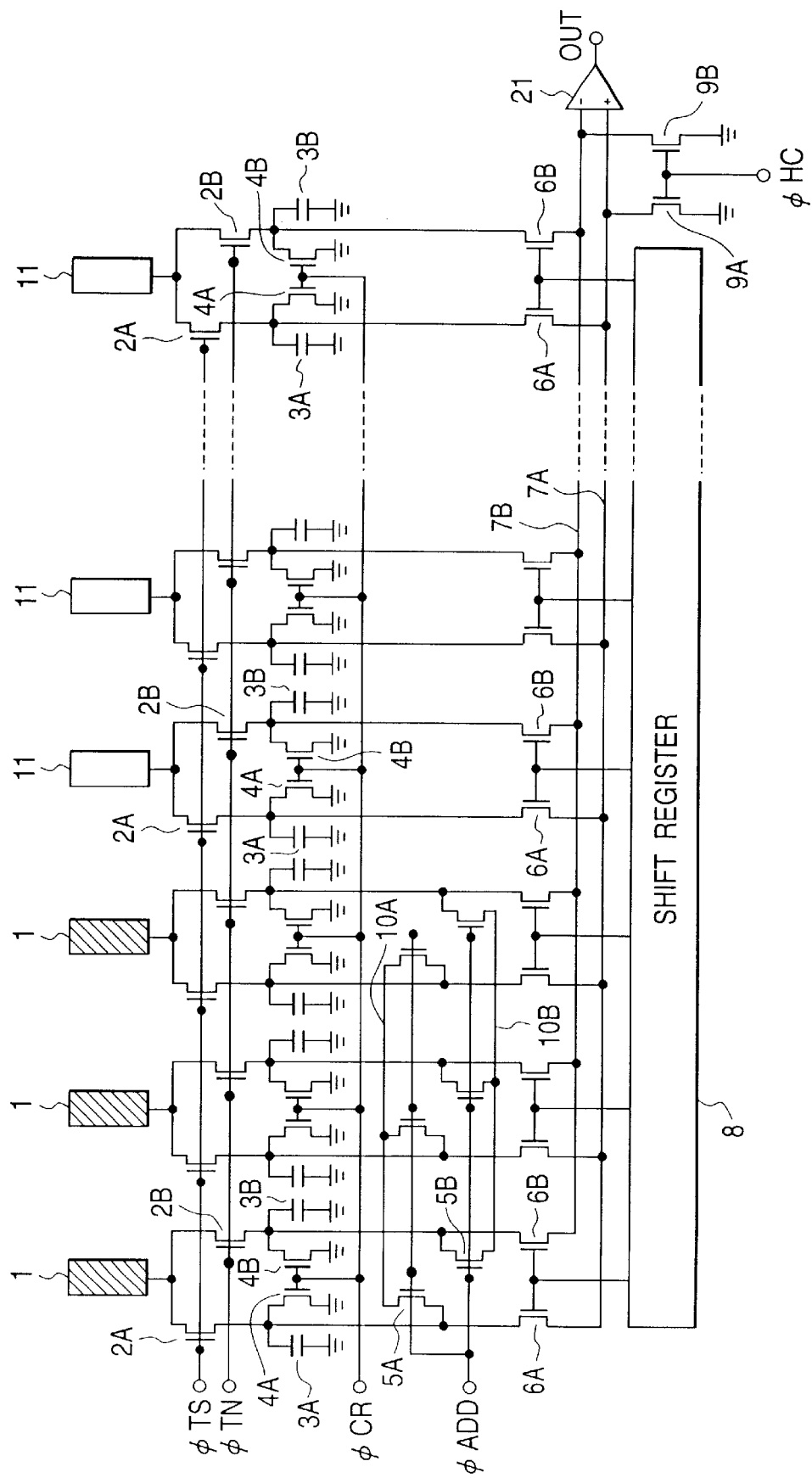
FIG. 5 is a circuit diagram for explaining the averaging method of OB pixel outputs according to the fourth embodiment of the present invention.

FIG. 5 shows the fourth embodiment of the present invention. FIG. 5 shows the arrangement wherein two systems of the circuit after the photoelectric conversion elements in FIG. 3 are arranged in units of photoelectric conversion elements, and the difference between the outputs from the two systems is calculated. In FIG. 5, symbols A and B appended to reference numerals respectively represent the two systems, and the same reference numerals in FIG. 5 denote the same constituting members as in FIG. 3. Note that a differential circuit 21 is connected to common read lines 7A and 7B and obtains a difference signal between the outputs on the two lines. The operation of this embodiment is substantially the same as that of the third embodiment as for the output of each system, except that the signals from OB pixels are added on storage capacitors CTS and CTN via common lines 10A and 10B.

More specifically, after the pixel signals from the OB pixels and effective pixels are stored in corresponding storage capacitors, switch transistors 2A and 2B are disabled, and thereafter, when a high-level averaging control pulse φADD is applied to simultaneously enable CT addition switch transistors 5A and 5B, the storage capacitors CTS 3A are connected to each other through the common line 10A and also the storage capacitors CTH 3B are connected to each other through the common line 10B, and thereby averaging the pixel signals read out from OB pixels 1 to corresponding storage capacitors CTS 3A and CTN 3B. Thereafter, the switch transistors 5A and 5B are disabled, and read switch transistors 6A and 6B are enabled in response to timing signals from the shift register 8 to output charges in the storage capacitors CTS 3A and CTN 3B onto common read lines 7A and 7B. The pixel signals on the common read lines 7A and 7B are differentially amplified by the differential circuit 21, and the differential output is output to the terminal OUT.

In this embodiment, as in the third embodiment, a reference output in which random noise components are averaged can be obtained, and pixel signals, exceeding the reference output, from the individual pixels are output, thus obtaining an output image which suffers less density nonuniformity. Also, fixed pattern noise (FPN) can also be removed.

Note that an image signal obtained by this embodiment, i.e., a reference signal is input to a clamp circuit after the output terminal of the solid-state image pickup device of this embodiment, and is used as a clamp voltage of the clamp circuit, thus easily obtaining an image signal exceeding this clamp voltage.

In the above embodiments, a line sensor has been especially exemplified. However, the present invention can also be applied to an area sensor. More specifically, in a chip that mounts a two-dimensional matrix of photoelectric conversion elements prepared in a single process, OB pixels and effective pixels are assigned in units of rows and columns, a light-shielding plate or film is formed on OB pixel portions, and one field signal during one vertical period can be obtained by outputting effective components based on pixel signals of effective pixels while switching a reference signal of a clamp circuit every time signals for one horizontal scanning period are read out from OB pixels. By comparing field signals, differences in the column direction in one line can be obtained. In order to reduce density nonuniformity in the column direction, a plurality of initial lines are used as OB pixels, the outputs from those OB pixels are averaged in the vertical direction to obtain a reference signal, and the reference signal is supplied to a field clamp circuit connected to the output side of the device, thus preventing density nonuniformity produced in units of fields.

In the above description, the outputs from all the OB pixels are averaged. Of course, the output from some OB pixels alone may be averaged. The outputs from OB pixels having different surrounding conditions from those of other OB pixels, for example, OB pixels adjacent to effective pixels or OB pixels located at the ends of a line do not have a close relationship with effective pixels and are preferably not used as the values to be averaged.

As described above, according to a solid-state image pickup device of an embodiment of the present invention, since an OB pixel output in which random noise components are averaged, i.e., random noise is reduced, can be obtained, an output image which suffers less density nonuniformity can be obtained using this OB pixel output as a reference output. When dark and light outputs are output from each pixel to obtain the reference output, an image signal from which fixed pattern noise can be removed and which suffers less density nonuniformity can be obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. A solid-state image pickup device which comprises a plurality of storage means for storing pixel signals output from a plurality of photoelectric conversion elements, which are formed on a single semiconductor substrate and at least two of which are shielded from light, in correspondence with said photoelectric conversion elements, wherein each of said storage means comprises capacitances for respectively storing a noise component and a signal component from the photoelectric conversation element, and a reference output is obtained by averaging pixel signals in said capacitances and differentially outputting output signals for the noise and signal components, and wherein pixel signal outputs from the shielded photoelectric conversion elements are subjected to averaging processing on said storage means.

2. A solid-state image pickup device which comprises a plurality of storage means for storing pixel signals output from a plurality of photoelectric conversion elements, which are formed on a single semiconductor substrate and at least two of which are shielded from light, in correspondence with said photoelectric conversion elements, wherein pixel signal outputs from the shielded photoelectric conversion elements are subjected to averaging processing in said storage means, and wherein the averaging processing is attained by combining the pixel signals in said storage means corresponding to the shielded photoelectric conversion elements by using semiconductor switch means.

3. A solid-state image pickup apparatus comprising:

a plurality of photoelectric conversion elements including a plurality of unshielded photoelectric conversion elements and a plurality of shielded photoelectric conversion elements;

a plurality of storage means for storing signals from said plurality of photoelectric conversion elements;

timing means for storing the signals from said plurality of photoelectric conversion elements into said plurality of storage means at a same timing;

averaging means for performing an averaging processing of signals stored in the plurality of storage means in which the signals from said plurality of shielded photoelectric conversion elements are stored, on said plurality of storage means corresponding to said plurality of shielded photoelectric conversion elements;

a read-out line for reading out the signals output from said plurality of unshielded photoelectric conversion elements, which are stored in said plurality of storage means, and an average signal provided by the averaging processing by said averaging means; and read-out means for reading out the signals output from said plurality of unshielded photoelectric conversion elements, which are stored in said plurality of storage means, and the average signal provided by the averaging processing.

4. An apparatus according to claim 3, wherein said read-out line is a common read-out line for outputting in common, the signals output from said plurality of unshielded photoelectric conversion elements, which are stored in said plurality of storage means, and the average signal provided by the averaging processing, and wherein said read-out means includes transfer means for sequentially transferring the signals output from said plurality of unshielded photoelectric conversion elements, which are stored in said plurality of storage means, and the average signal to said common read-out line.

5. A solid-state image pickup apparatus comprising:

a plurality of photoelectric conversion elements including a plurality of unshielded photoelectric conversion elements and a plurality of shielded photoelectric conversion elements;

a plurality of storage means for storing signals from said plurality of photoelectric conversion elements;

timing means for storing the signals from said plurality of photoelectric conversion elements into said plurality of storage means at a same timing;

connection means for connecting a plurality of storage means in which the signals from said plurality of shielded photoelectric conversion elements are stored, and for performing an averaging processing of the signals from said plurality of shielded photoelectric conversion elements; and read-out means for reading out the signal output from said plurality of unshielded photoelectric conversion elements, which are stored in said plurality of storage means, and an average signal provided by the averaging processing.

6. An apparatus according to claim 5, wherein said read-out means includes a common read-out line for outputting in common, the signal output from said plurality of unshielded photoelectric conversion elements, which are stored in said plurality of storage means, and the average signal provided by the averaging processing and transfer means for sequentially transferring the signals output from said plurality of unshielded photoelectric conversion elements, which are stored in said plurality of storage means, and the average signal to said common read-out line.

7. A solid-state image pickup apparatus comprising:

a plurality of photoelectric conversion elements including a plurality of unshielded photoelectric conversion elements and a plurality of shielded photoelectric conversion elements;

averaging means for performing an averaging processing of signals from said plurality of shielded photoelectric conversion elements;

a common read-out line for reading out in common, signals from said plurality of unshielded photoelectric conversion elements and an average signal provided by the averaging processing by said averaging means; and scanning means for reading out the signal output from said plurality of unshielded photoelectric conversion elements and the average signal provided by the averaging processing to said common read-out line.

8. An apparatus according to claim 7, further comprising a plurality of storage means for storing signals from said plurality of photoelectric conversion elements and timing means for storing the signals from said plurality of photoelectric conversion elements into said plurality of storage means at a same timing.

9. An apparatus according to claim 8, wherein said averaging means includes connection means for connecting a plurality of storage means in which the signals from said plurality of shielded photoelectric conversion elements are stored, and for performing the averaging processing of the signals from said plurality of shielded photoelectric conversion elements.

10. A solid-state image pickup apparatus comprising:

photoelectric conversion elements arranged in a plurality of lines, a plurality of photoelectric conversion elements arranged in each of said plurality of lines including a plurality of unshielded photoelectric conversion elements and a plurality of shielded photoelectric conversion elements;

a plurality of storage means;

first read-out means for reading out signals from said plurality of photoelectric conversion elements into said plurality of storage means on a one line basis at a same timing;

connection means for connecting a plurality of storage means in which the signals from said plurality of shielded photoelectric conversion elements are stored, and for performing an averaging processing of the signals from said plurality of shielded photoelectric conversion elements; and second read-out means for reading out the signals output from said plurality of unshielded photoelectric conversion elements, which are stored in said plurality of storage means, and the average signal.

11. An apparatus according to claim 10, wherein said second read-out means includes a common read-out line for outputting in common, the signals output from said plurality of unshielded photoelectric conversion elements, which are stored in said plurality of storage means, and the average signal provided by the averaging processing and transfer means for sequentially transferring the signals output from said plurality of unshielded photoelectric conversion elements, which are stored in said plurality of storage means, and the average signal to said common read-out line.

12. A solid-state image pickup apparatus comprising:

photoelectric conversion elements arranged in a plurality of lines, the photoelectric conversion elements arranged in each of said plurality of lines including a plurality of unshielded photoelectric conversion elements and a plurality of shielded photoelectric conversion elements;

a plurality of storage means;

first read-out means for reading out signals from said photoelectric conversion elements on a one line basis at a same timing;

averaging means for performing an averaging processing of the signals stored in a plurality of storage means in which the signals from said plurality of unshielded photoelectric conversion elements are stored, on said plurality of storage means;

a read-out line for reading out the signal output from said plurality of unshielded photoelectric conversion elements, which are stored in said plurality of storage means, and an average signal provided by the averaging processing by said averaging means; and second read-out means for reading out the signals output from said plurality of unshielded photoelectric conversion elements, which are stored in said plurality of storage means, and the average signal to said read-out line.

13. An apparatus according to claim 12, wherein said read-out line is a common read-out line for outputting in common, the signals output from said plurality of unshielded photoelectric conversion elements, which are stored in said plurality of storage means, and the average signal provided by the averaging processing, and wherein said second read-out means includes transfer means for sequentially transferring the signals output from said plurality of unshielded photoelectric conversion elements, which are stored in said plurality of storage means, and the average signal to said common read-out line.

14. A solid-state image pickup apparatus comprising:

a plurality of photoelectric conversion elements including a plurality of unshielded photoelectric conversion elements and a plurality of shielded photoelectric conversion elements;

first averaging means for averaging signals generated when said plurality of shielded photoelectric conversion elements are reset;

second averaging means for averaging signals from said plurality of shielded photoelectric conversion elements after a predetermined time period from reset of said plurality of shielded photoelectric conversion elements;

first read-out means for reading out signals generated when said plurality of unshielded photoelectric conversion elements are reset;

second read-out means for reading out signals from said plurality of unshielded photoelectric conversion elements after a predetermined time period from the reset of said plurality of unshielded photoelectric conversion elements; and difference means for performing, a subtracting processing between an averaged signal provided by said first averaging means and a averaged signal provided by said second averaging means and a subtracting processing between the signals of the same photoelectric conversion elements, which are read out by said first read-out; means and said second read-out means respectively.

15. An apparatus according to claim 14, further comprising first storage means for storing signals generated when said plurality of photoelectric conversion elements are reset and second storage means for storing signals from said plurality of photoelectric conversion elements after a predetermined time period from reset of said plurality of photoelectric conversion elements, wherein said first averaging means includes first connection means for connecting the first storage means in which the signals from said plurality of shielded photoelectric conversion elements are stored, and for performing an averaging processing of the signals from said plurality of shielded photoelectric conversion elements, and wherein said second averaging means includes second connection means for connecting the second storage means in which the signals from said plurality of shielded photoelectric conversion elements are stored, and for performing an averaging processing of the signals from said plurality of shielded photoelectric conversion elements.

* * * * *

UNITED STATES PATENT AND TRADEMARK OFFICE
CERTIFICATE OF CORRECTION

PATENT NO. : 6,130,712
DATED : October 10, 2000
INVENTOR(S) : Keizo Miyazaki et al.

Page 1 of 1

It is certified that error appears in the above-identified patent and that said Letters Patent is hereby corrected as shown below:

Title page,
Item [57], ABSTRACT,
Line 4, "which" should be deleted.

Column 1,
Line 29, "expected" should read -- expected to be --.

Column 10,
Line 32, "a averaged" should read -- an averaged --.

Signed and Sealed this

Nineteenth Day of February, 2002

Attest:

Attesting Officer

JAMES E. ROGAN
Director of the United States Patent and Trademark Office